（12） United States Patent
Wichern

(10) Patent No.: US 8,863,794 B2
(45) Date of Patent: Oct. 21, 2014

(54) INTERNAL WHEEL SUSPENSION SYSTEM WITH SHOCK ABSORPTION

(76) Inventor: David L. Wichern, St. Louis, MO (US)

( * ) Notice: Subject to any disclaimer, the term of this patent is extended or adjusted under 35 U.S.C. 154(b) by 0 days.

(21) Appl. No.: 13/136,930

(22) Filed: Aug. 15, 2011

(65) Prior Publication Data

US 2014/0034198 A1    Feb. 6, 2014

Related U.S. Application Data

(63) Continuation-in-part of application No. 12/380,648, filed on Mar. 2, 2009, now abandoned, which is a continuation of application No. PCT/US2006/037737, filed on Sep. 28, 2006.

(60) Provisional application No. 60/721,884, filed on Sep. 29, 2005.

(51) Int. Cl.
*B60B 9/08* (2006.01)
*B60B 9/02* (2006.01)
*B60B 9/26* (2006.01)
*B60B 9/06* (2006.01)
*B62K 25/04* (2006.01)

(52) U.S. Cl.
CPC ............ *B60B 9/02* (2013.01); *B62K 2025/042* (2013.01); *B60B 2900/131* (2013.01); *B60B 9/26* (2013.01); *B60B 9/06* (2013.01); *B60B 2900/572* (2013.01); *B62K 25/04* (2013.01)
USPC ................................ 152/103; 152/87; 152/97

(58) Field of Classification Search
CPC ................ B60B 9/00; B60B 9/06; B60B 9/26
USPC .......... 152/17–18, 87, 97, 103, 105, 107, 109
See application file for complete search history.

(56) References Cited

U.S. PATENT DOCUMENTS

| | | | |
|---|---|---|---|
| 864,089 | A | 8/1907 | Finnell |
| 895,554 | A | 8/1908 | Graff |
| 927,511 | A | 7/1909 | Dunn |
| 929,570 | A | 7/1909 | Driefer |
| 969,024 | A | 8/1910 | Baker |
| 985,039 | A | 2/1911 | Kimball |
| 1,043,075 | A | 11/1912 | Day |
| 1,052,565 | A | 2/1913 | Burgess |
| 1,077,388 | A | 11/1913 | Bray |
| 1,086,162 | A | 2/1914 | Gray |
| 1,101,293 | A | 6/1914 | Kunkel |
| 1,144,879 | A | 6/1915 | Ubezzi |
| 1,146,314 | A | 7/1915 | Dugger |
| 1,155,246 | A | 9/1915 | Jutila |
| 1,176,705 | A | 3/1916 | Dye |
| 1,245,184 | A | 11/1917 | Bropson |
| 1,284,416 | A | 11/1918 | Million |
| 1,306,951 | A | 6/1919 | Cruthers |

(Continued)

*Primary Examiner* — Jason Bellinger
(74) *Attorney, Agent, or Firm* — Paul M. Denk

(57) ABSTRACT

An internal wheel suspension and shock absorbing system includes a hub with radially extending spokes, cooperating with springs axially mounted thereon, abutting a hub and entering the rim of a wheel. The spokes secure onto a hub that mounts onto the vehicle axle, for rotation. When a force is encountered, the forces are absorbed by the spokes, the springs, and the slots as the hub has limited translation within the rim. The springs are adjustable and bias against the head of the spokes and the hub, and absorb the impact of vector forces generated from any impact.

16 Claims, 9 Drawing Sheets

(56) References Cited

U.S. PATENT DOCUMENTS

| | | |
|---|---|---|
| 1,343,986 A | 6/1920 | Shafer |
| 1,436,840 A | 11/1922 | Weirich |
| 1,459,565 A | 6/1923 | Yankauer |
| 1,463,064 A | 7/1923 | Sequeira |
| 1,465,747 A | 8/1923 | Vobach |
| 1,510,414 A | 9/1924 | Patterson |
| 1,584,679 A | 5/1926 | Stoltz |
| 1,613,084 A | 1/1927 | Casey |
| 1,978,312 A | 10/1934 | Kanai |
| 1,979,935 A | 11/1934 | Henap |
| 2,375,705 A | 5/1945 | Starneno |
| 3,896,868 A | 7/1975 | Molitor |
| 6,698,480 B1 | 3/2004 | Cornellier |
| 7,810,533 B2 | 10/2010 | Wichern |
| 2006/0197305 A1 | 9/2006 | Wichern |
| 2010/0072807 A1* | 3/2010 | Wichem .................. 301/54 |

* cited by examiner

INTERNAL WHEEL SUSPENSION SYSTEM WITH SHOCK ABSORPTION

CROSS REFERENCE TO RELATED APPLICATION

This is a continuation-in-part patent application which claims priority to the continuation application having Ser. No. 12/380,648, filed on Mar. 2, 2009, which claims priority to the Patent Cooperation Treaty application having Serial No. PCT-U.S.-06/37737, filed on Sep. 28, 2006, which claims priority to the U.S. provisional application with the Ser. No. 60/721,884, filed on Sep. 29, 2005.

FIELD OF THE INVENTION

This invention relates generally to an internal wheel suspension and shock absorbing means, and more specifically pertains to a suspension system engaging a slotted rim of a caster.

BACKGROUND OF THE INVENTION

For decades, numerous suspension systems have been employed for enhancing shock absorption during application of the wheel as a caster for carts, stands, gurneys, wagons, bins, tubs, and other vehicles both powered and without power. Usually these types of suspension systems relate to the use of some form of springs, coil springs, leaf springs, and which provide normally for absorption of shock in the vertical direction. But, where a caster is utilized, in particular rugged conditions and usage, the terrain encountered may present forces that are generated in other than the vertical direction, and could be even horizontally exerted, or angularly exerted, in addition to impact and shock that is encountered along the vertical dimension. These types of suspension systems, for cushioning the ride of any vehicle, are well documented.

The current invention is designed to provide for a suspension system that can absorb shock, more efficiently, that is exerted from the vertical and other angular directions.

Initially, as early as 1908, inventors addressed how to suspend a wheel internally with springs in various configurations, generally radially, to cushion the wheels against road impacts in early automobiles and casters.

Pertinent suspended wheels can be seen beginning with the patent to Dunn, U.S. Pat. No. 927,511. This spring wheel shows springs located around rods that bias the rod outwards. However, the '511 patent lacks a slot on the interior of the wheel rim and has no threads in the hub that engage the rods. The rods and springs are also covered by a disc of some sort against road debris.

The patent to Graff, U.S. Pat. No. 895,554 shows a vehicle wheel having telescoping spokes. A spring is outside each spoke and the outer portion of the spoke rests upon the spring and has a Y shaped yoke. The inner portion of the spoke acts as a tube and receives the outer portion. The inner portion threadily connects to the hub. Unlike this patent, the present invention has a single piece spoke that engages a slot in the interior of a wheel rim.

Then the patent to Dye, U.S. Pat. No. 1,176,705, shows another spring wheel. This spring wheel has a series of radial spokes formed from two slideably connected parts within a spring. The spring is contained within a nut and a flange. In this patent, the spoke is pinned to the hub and to the rim and has two portions. The present invention on the other hand is threaded to the hub and moves partially along the rim in a slot while the spokes are a single piece.

Other related patents include U.S. Pat. No. 929,570 to Driefer on a spring wheel, U.S. Pat. No. 1,043,075 to Day on a resilient wheel, U.S. Pat. No. 1,077,388 to Bray on a vehicle wheel, U.S. Pat. No. 1,146,314 to Dugger on a vehicle wheel, U.S. Pat. No. 1,245,184 to Bropson on a resilient wheel, U.S. Pat. No.1,284,415 to Million on a spring wheel, U.S. Pat. No. 1,463,064 to Sequeira on a resilient wheel, U.S. Pat. No. 1,510,414 to Patterson on a spring wheel, U.S. Pat. No. 1,613,084 to Casey on a resilient wheel, U.S. Pat. No. 1,978,312 to Kanai on a motorcycle frame, and U.S. Pat. No. 3,194,293 to Kindley on a shock absorbing caster wheel.

Then around 1951 and later, a spiral type of suspension spring was utilized upon at least the rear wheel of a motorcycle, to absorb better the forces of impact, particularly in off road racing and competition.

Related types of suspensions that have been patented can be seen in the patent to Kimball, U.S. Pat. No. 95,039. This particular device shows a spring wheel that has a variety of semi-radially disposed spokes, each of which has a spring bias rod and tube combination, and which surrounds the hub, for suspending the rim and its tire in place.

The patent to Gray, U.S. Pat. No. 1,086,162, shows another spring wheel where the spokes essentially include spring mounted rod and tube combinations, in order to further buffer and provide shock absorbing for the supported wheel.

The patent to Ubezzi, U.S. Pat. No. 1,144,879, shows another vehicle wheel, similar to the Gray device, wherein the spokes essentially have spring mounts within them, to enhance shock absorbing.

The patent to Jutila, U.S. Pat. No. 1,155,246, shows another resilient wheel. This device incorporates tangential springs, inner poles between spokes and the rim, apparently for providing cushioning with respect to the rim. The steel wires of the wheel are fixed, in the manner of spokes, between the rim brackets and the inner rim ring, as can be noted.

The patent to Cruthers, U.S. Pat. No. 1,306,951, shows a yieldable bearing and support therefor. This is more of a bearing but incorporates an inner hub, with the outer rim, and does include lateral cushioning springs within its structure. These are biased against the rocker arms. Thus, lateral support is provided through this type of structure, for a wheel like structure, but unlike the current invention.

The patent to Shafer, U.S. Pat. No. 1,343,986, shows another resilient wheel that includes spokes, identified as helical springs upon the elements as shown, but these connect directly between the hub, and the outer rim.

The patent to Weirich, U.S. Pat. No. 1,436,840, is upon another vehicle wheel. This device apparently pivotally connects its arms to the outer rim or tread member of the wheel, and does include a series of shock absorbing devices therebetween.

It appears that there may be a direct connection between the hub and the rim, through some type of linkage on the shown arms.

The patent to Yankauer, U.S. Pat. No. 1,456,565, shows another resilient wheel. This wheel shows a structured hub that incorporates a series of members, having varying members extending therefrom, with tangential springs provided for mounting of the hub relative to its rim. This design differs from the structure of the present invention.

The patent to Vobach, U.S. Pat. No. 1,465,747, shows another spring wheel with another way of mounting through the use of a spring by a spoke between the hub and the rim of the tire.

The patent to Stoltz, U.S. Pat. No. 1,584,679, shows another resilient wheel. This one uses spokes arranged at right angles, and which are spring biased, to add to the support for the wheel, and to add to the absorption of shock.

The patent to Henap, U.S. Pat. No. 1,979,935, shows a hydraulic spoke wheel. This device includes a variety of hydraulic cylinders arranged as spokes at various angles to enhance the resiliency of mounting of the wheel upon its hub.

The patent to Molitor, U.S. Pat. No. 3,896,868, shows a resiliently mounted auxiliary wheel for a tractor. This wheel includes a variety of spring biased telescoping rods and tubes, as shock absorbers, functioning as spokes within the rim, for supporting the wheel.

Finally, the patent to Cornellier, U.S. Pat. No. 6,698,480, shows a non pneumatic tire and wheel system. This device simply utilizes compound shocks, as can be noted, in lieu of spokes within the solid tire which is not the structure of the present invention.

The present invention overcomes the limitations of the prior art explained above. That is, the art of the present invention allows a slotted rim for relocating a suspension system temporarily within a wheel under a non vertical force or shock. The slotted rim is on the interior face of the rim and connects with the suspension system supporting the hub generally at the center of the caster.

SUMMARY OF THE INVENTION

Essentially, this invention relates to an internal wheel suspension and shock absorbing system. The device includes the suspension and shock absorbing means that are arranged internally of the wheel structure, and can absorb much greater shock, even that which is angularly generated, particularly for cargo equipment using casters and for off-road vehicles such as a bicycle, motor vehicle, motorcycle, trailer, wagon, cart, SUV, and the like.

The wheel structure, at a hub on a central axis, in the preferred embodiment, has rigidly mounted thereto a plurality, such as three, radially disposed spokes. These spokes are placed at the hub, and which is pivotally mounted onto the axle, and rotates thereupon. The spokes extend radially outwardly within the rim. At the terminus of each spoke, the rim incorporates a slot therein, and into which the spoke extends forming the assembled device. Each spoke has at least one coaxial spring that is biased against the rim and the hub. Hence, when the wheel hits a bump, the hub biases against the various springs, which function as shock absorbers and that, furnish a suspension means for the wheel, and the spokes move in a plane parallel to that of the rim. The suspension means or spokes provide for angulated support, for each of the spokes that extend from the hub, so that the vertical forces and angular forces can be absorbed by the various spokes into the rim and the hub therebetween the spokes, and to provide more than just vertical suspension and shock absorbing during usage.

As before, when a wheel hits an obstacle or bump, these spokes bias against their various springs, to function as shock absorbers, and to suspend the wheel, during usage. The present invention provides a much greater suspension for the wheel, and can absorb far more shock, particularly where these wheels are used for cargo carrying and in an off-road setting, as upon a rough terrain.

Obviously, the suspension system for this invention, or spokes, could include other polygonaly shaped spokes, such as a square, tubular, or slender, all arranged symmetrically within the rim of the tire in which the suspension system is incorporated. In a specific embodiment, the wheel structure at its central axis will incorporate at least three, preferably five, radially disposed spokes. The present invention is affixed to the tire axis as aforesaid. The spokes extend radially outwardly, within the tire, and aligned with its rim, for cooperating with springs that abut the internal edge of the rim of the tire. These five spokes each terminate with a head in individual slots in the rim, and are cushionally held in position within the rim by means of at least one coaxial spring upon each spoke that acts as a cushioning means. Hence, when the wheel hits a bump, the hub and the spokes bias against the various springs to function as shock absorbers and to furnish a suspension means for the wheel. This type of a device provides much greater suspension for the wheel, smoother ride, and far more shock absorption, particularly where this type of vehicle is used for carrying cargo or in the off-road environment.

Numerous objects, features and advantages of the present invention will be readily apparent to those of ordinary skill in the art upon a reading of the following detailed description of the presently preferred, but nonetheless illustrative, embodiment of the present invention when taken in conjunction with the accompanying drawings. Before explaining the current embodiment of the invention in detail, it is to be understood that the invention is not limited in its application to the details of construction and to the arrangements of the components set forth in the following description or illustrated in the drawings.

The invention is capable of other embodiments and of being practiced and carried out in various ways. Also, the phraseology and terminology employed herein are for the purpose of description and should not be regarded as limiting.

It is, therefore, the principal object of this invention to provide an internal wheel suspension and shock absorbing system.

Another object of this invention is to provide spring biasing upon spokes that connect with a centrally located hub for locating an axle therethrough, such as a caster, for providing angular support and suspension for its rim and tire during movement.

Yet another object of this invention is to provide for a suspended type of spoke mechanism, embraced within slots on the interior of a rim thus furnishing angular support to a vehicle tire, and greater shock absorption during its impact when upon rough terrain.

Yet another object of this invention is to provide a shock absorbing and internal wheel suspension system that can be quickly removed and replaced from a cart, gurney, or other vehicle wheel, during usage.

Yet another object of this invention is to provide for shock absorbing that is effective for absorbing impact that can be generated and oriented from various angular positions depending on the type of terrain or obstacle that is encountered by a wheel or caster.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated a preferred embodiment of the invention.

DESCRIPTION OF THE DRAWINGS

In referring to the drawings.

The same reference numerals refer to the same parts throughout the various figures.

DESCRIPTION OF THE PREFERRED EMBODIMENT

Figure 1:
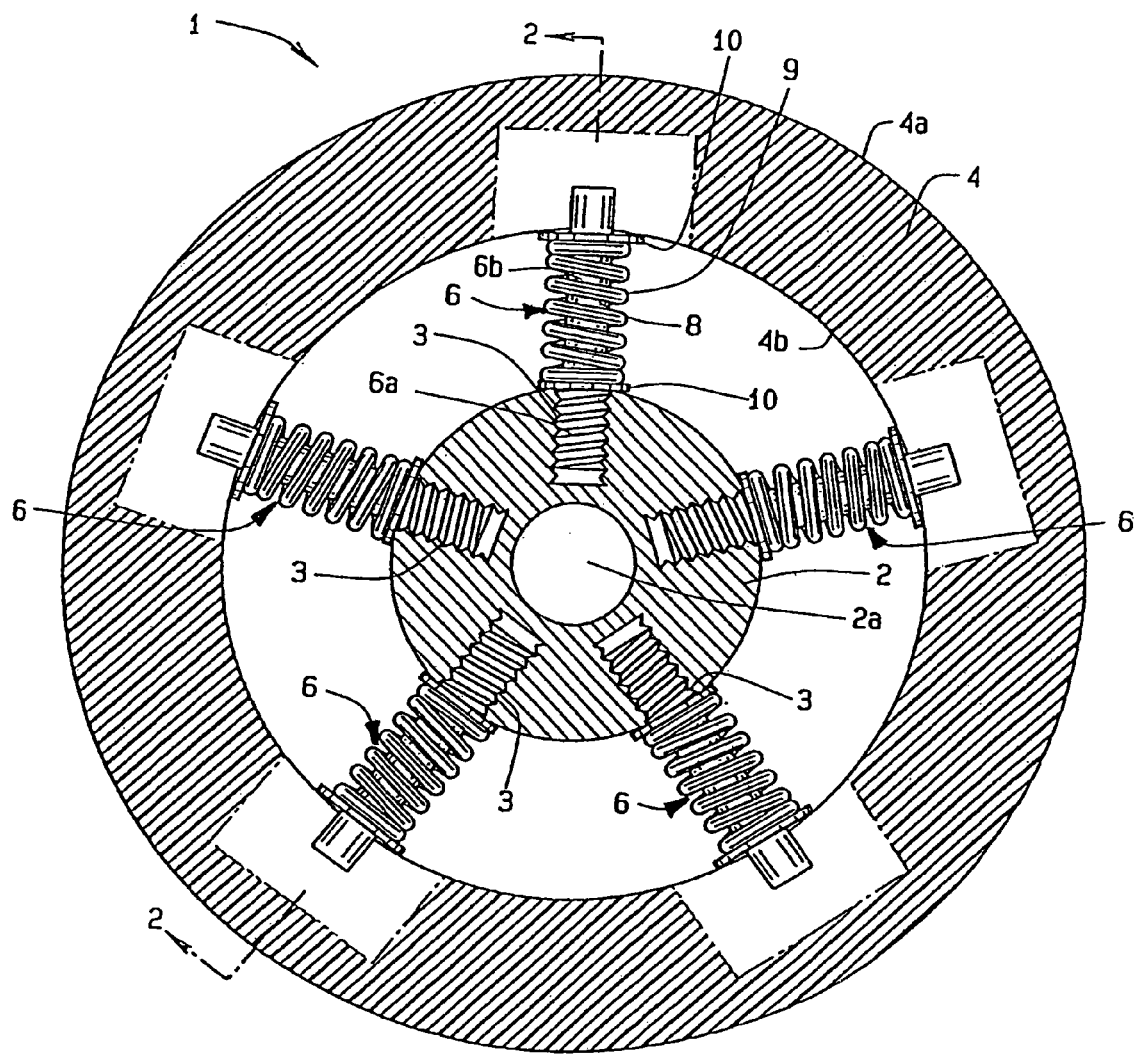
FIG. 1 provides a plan view of a wheel, such as one for a caster, showing the internal wheel suspension and shock absorbing system of the present invention.

In referring to the drawings, and in particular FIG. 1, the internal wheel suspension system with a slotted rim of this invention is disclosed. Within a wheel on a vehicle or a piece of equipment, a rim supports the wheel. Here FIG. 1 shows a plan view along a plane coaxial with the diameter of the wheel 1. The rim 4 has at least three, and preferably five, equally spaced slots 5 upon the inside circumference 4b of the rim. At each slot 5, a spoke 6 partially occupies the slot and extends radially inwards towards a hub 2. Each spoke has a first end 6a positioned towards the hub 2 and a second opposite end 6b positioned towards the rim 4. Each spoke has a shaft 8 located between the first and second ends. The hub has a generally solid cylindrical shape with a central bearing to admit an axle. In the preferred embodiment, the hub extends slightly longer than the thickness of the wheel.

More particularly, the hub has contact points 3 or radial holes equally spaced around the circumference that admit the first ends 6a of each spoke. In the preferred embodiment, the spokes are round solid cylinders and the first ends are threaded while the hub has threaded holes 3 to receive the first ends. Threaded holes in cooperation with the first end of each spoke form a fixed connection. The threaded holes for the hub and the spokes within slots allow the hub to translate as a unit within the rim upon the impact of the wheel with a bump or obstacle. The holes extend into the hub and into the longitudinal hole for the axle. Generally the spokes are not threaded into contact with the axle.

Then along each spoke between the hub and the rim, a spring 9 passes over and around a spoke 6. The spring 9 is coaxial with the shaft 8 of the spoke. The spring has a minimum stiffness where the springs upon all of the spokes maintain the hub centered in the wheel when under the rated cargo load for the caster or wheel. Where the spring approaches the second end of the spoke, the spring 9 rests upon a washer 10 that slides upon the rim 4. Where the spring approaches the first end of the spoke, the spring also rests upon a washer 10 upon the hole 3. The washers 10 prevent the springs 9 from jamming in the slots 5 and the holes 3 upon the hub. In an alternate embodiment, each spoke has two springs 9 with the second spring intertwined with the first as a backup in the event of failure of the first spring and both springs are generally at half the stiffness of the springs in the preferred embodiment.

Opposite the first end on each spoke, each spoke has a second end 6b placed within each slot 5. The second end extends from the shaft with the same diameter. The second end fits snugly within the slot 5 but permits the spoke to slide in the slot under the action of a force encountered when the wheel hits an obstacle or bump. The slot has clearance that permits a floating connection of the spoke and the rim while the slot itself has an elongated shape with a length at least twice as long as its width and a depth to allow the second end to move into the rim as the hub moves. The slots 5 have a length that permits rotation of the hub 2, when the wheel is not loaded, through an angle of at least three degrees. Each slot 5 is generally centered in the thickness of the rim. The slots in the rim, at each spoke, generally have the same width and length.

In an alternate embodiment, the second end has a head, with at least two parallel edges, that slides within the slot 5. The head can be square, rectangular, hexagonal, square with rounded corner, and the like in shape. The head allows the shaft to slide within the slot but not rotate.

Figure 2:
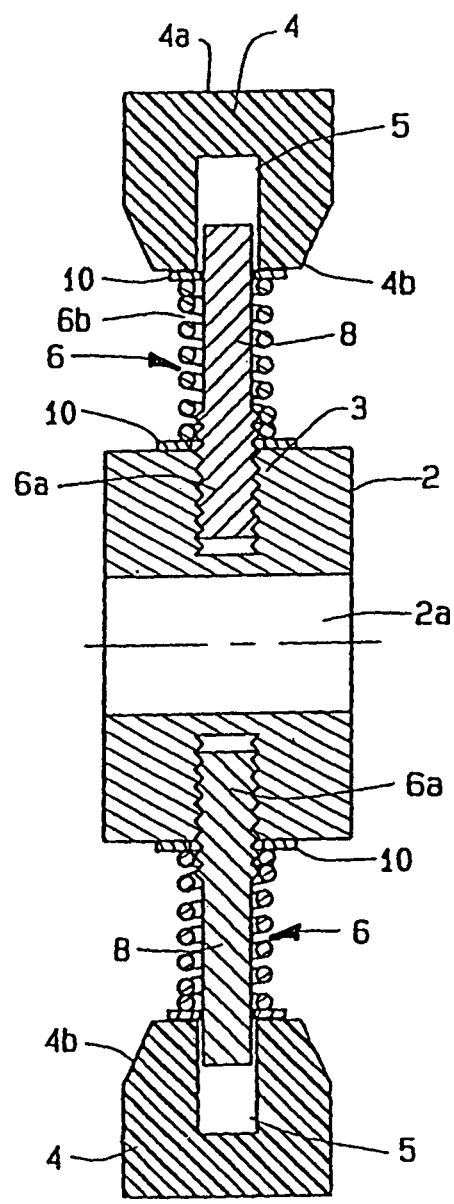
FIG. 2 shows a sectional view of the wheel of FIG. 1 where the spokes enter the hub of the present invention.

Turning to FIG. 2, the present invention is shown in a section through the hub and generally two spokes. Inside of the wheel, a rim has a generally round shape with an interior surface and an opposite exterior surface. The wheel or tire adjoins the exterior surface. Upon the interior surface, the rim has slots in a spaced pattern that admit the heads of spokes. The slots have sufficient width so the second end may slide along a tangent to the spoke. The slots have sufficient depth so the second end may advance into the rim to adjust the position of the hub. Inside of the second ends on each spoke, a shaft proceeds on a radius of the wheel. The shaft is generally a cylinder, preferably round. The shaft continues towards the hub. Outside of the shaft, at least one spring is coaxial with the shaft. The spring abuts a washer placed around the shaft and towards the second end but just inside the rim. Opposite the rim, the spring abuts another washer upon the shaft adjacent to the hub at the first end of a spoke. The first end of the spoke then threadily engages a hole 3 in the hub as later shown in FIG. 3. The threaded holes in the hub in cooperation with the nuts permit installation and later adjustment of the present invention. The threaded holes extend into the hub but do not contact any axle placed through the bearing at the center of the hub.

Figure 3:
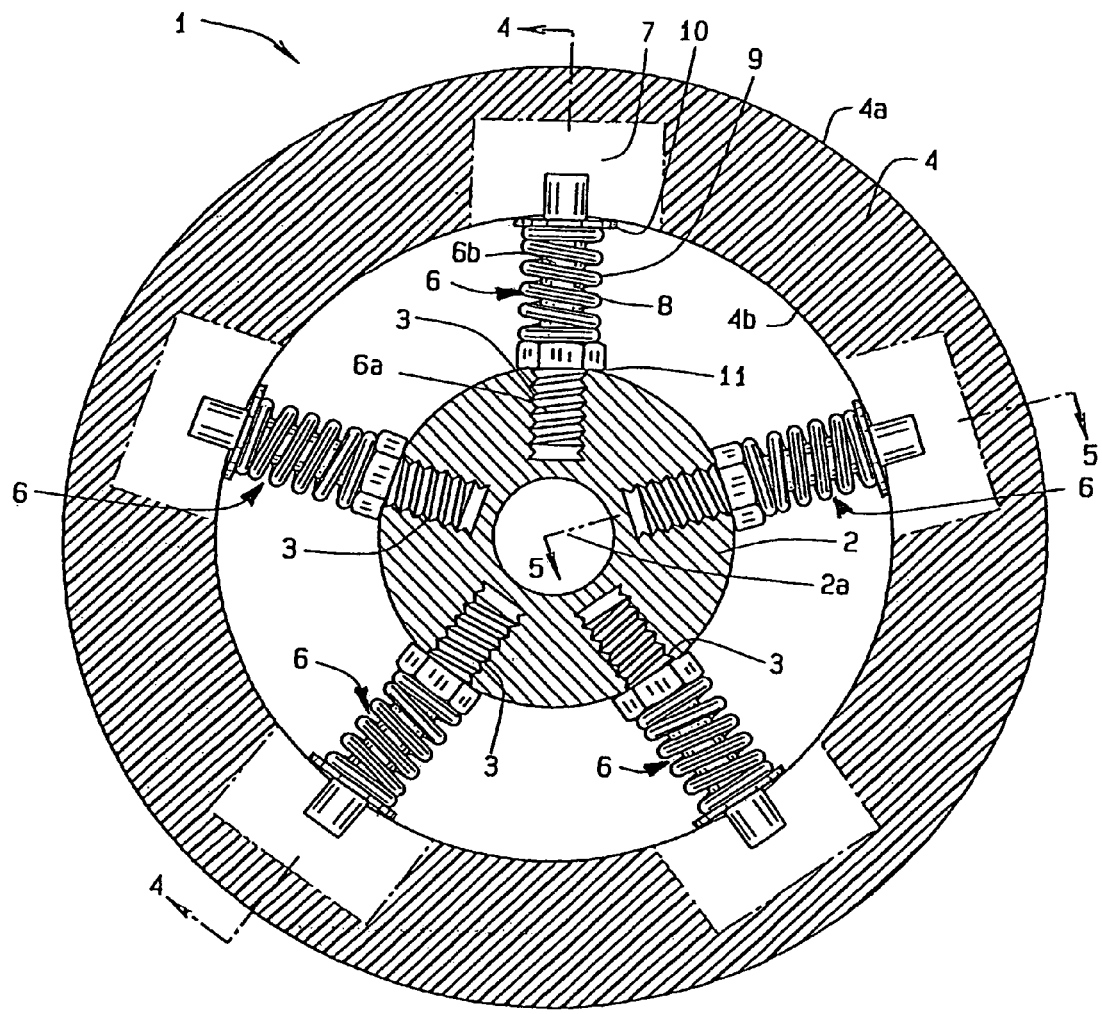
FIG. 3 provides a plan view of a wheel showing the present invention particularly spokes with adjusting nuts adjacent to the hub.

Here FIG. 3 shows a plan view along a plane coaxial with the diameter of the wheel 1 for an alternate embodiment of the invention. The rim 4 has preferably five equally spaced slots 5 upon the inside circumference 4b of the rim. At each slot 5, a spoke 6 partially occupies the slot and extends radially inwards towards a hub 2. Each spoke has a first end 6a positioned towards the hub 2 and a second opposite end 6b positioned towards the rim 4. More particularly, the hub has radial holes 3 equally spaced around the circumference that admit the first ends 6a of each spoke. As before, the threaded holes for the hub 3 and the spokes 6 allow the hub 2 to translate as a unit within the rim upon the impact of the wheel with a bump or obstacle. The holes extend into the hub but do not contact an axle placed therethrough.

Then along each spoke between the hub and the rim, a spring 9 passes over and around a spoke 6 thus being coaxial with the shaft 8 of the spoke. The spring has a minimum stiffness that maintains the hub as centered in the wheel when under the rated cargo load for the caster or wheel. Where the spring approaches the second end of the spoke, the spring 9 rests upon a washer 10 that slides upon the rim 4. Where the spring approaches the first end of the spoke, the spring rests upon a nut 11 threaded upon the first end and generally abutting the hub 2. In an alternate embodiment, each spoke has two springs 9 with the second spring intertwined with the first as a backup in the event of failure of the first spring and both springs are generally at half the stiffness of the springs in the preferred embodiment.

Opposite the first end on each spoke, each spoke has a second end 6b placed within each slot 5. The second end extends from the shaft with the same diameter and fits snugly within the slot 5. The second end permits the spoke to slide in the slot when the wheel hits an obstacle or bump. The slot has an elongated shape with a length at least twice as long as its width and a depth to allow the second end to moved into the rim as the hub moves. The slots 5 have a length that permits rotation of the hub 2, when the wheel is not loaded, through an angle of at least three degrees. Each slot 5 is generally centered in the thickness of the rim. The slots in the rim, at each spoke, generally have the same width and length.

In an alternate embodiment, the second end has a head, with at least two parallel edges, that slides within the slot 5. The head can be square, rectangular, hexagonal, square with rounded corner, and the like in shape. The head allows the shaft to slide within the slot but not rotate.

Figure 4:
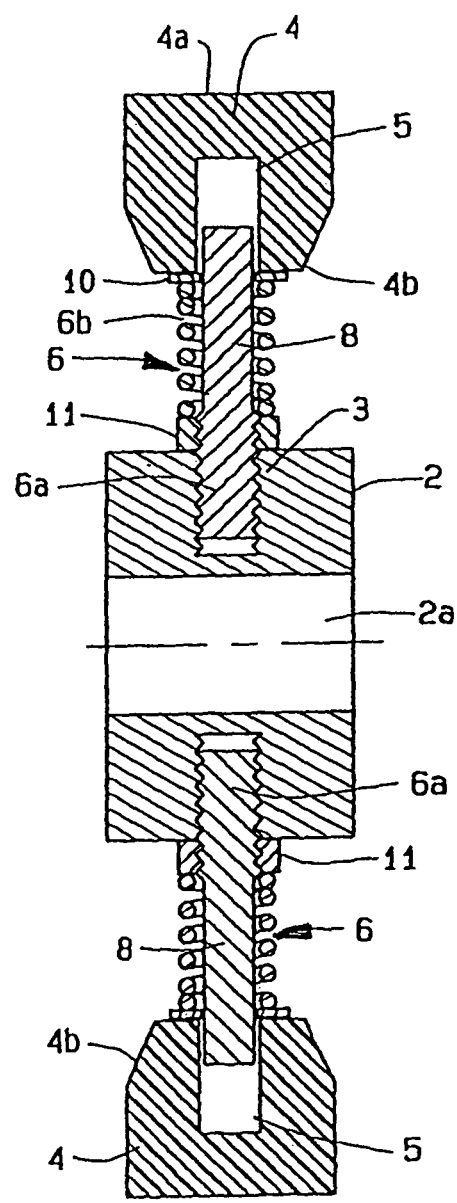
FIG. 4 shows a sectional view of the wheel of FIG. 3 where the spokes enter the hub of the present invention.

Turning to FIG. 4, the present invention is shown in a section through the hub and generally two spokes. Inside of the wheel, a rim has a generally round shape with an interior surface and an opposite exterior surface. The wheel or tire adjoins the exterior surface. Upon the interior surface, the rim has slots in a spaced pattern that admit the second ends of the spokes. The slots have sufficient width so the second ends slide along a tangent to the spoke and sufficient depth so the second ends advance into the rim to adjust the position of the hub. Inside of the second ends on each spoke, a shaft proceeds on a radius of the wheel. The shaft is generally a cylinder, preferably round. The shaft continues towards the hub. Outside of the shaft, at least one spring is coaxial with the shaft. The spring abuts a washer placed around the shaft and towards the second end but just inside the rim, here at the second end of the spoke. Opposite the washer, the spring abuts a nut threadily engaged upon the shaft, here at the first end of a spoke. The first end of the spoke then threadily engages a hole in the hub as later shown in FIG. 5. The threaded holes in the hub in cooperation with the nuts permit installation and later adjustment of the present invention. Turning of the nut advances the spoke into the hub or draws the spoke from the hub as needed during assembly or usage of the wheel. The threaded holes extend into the hub but do not contact any axle placed through the center of the hub.

Figure 5:
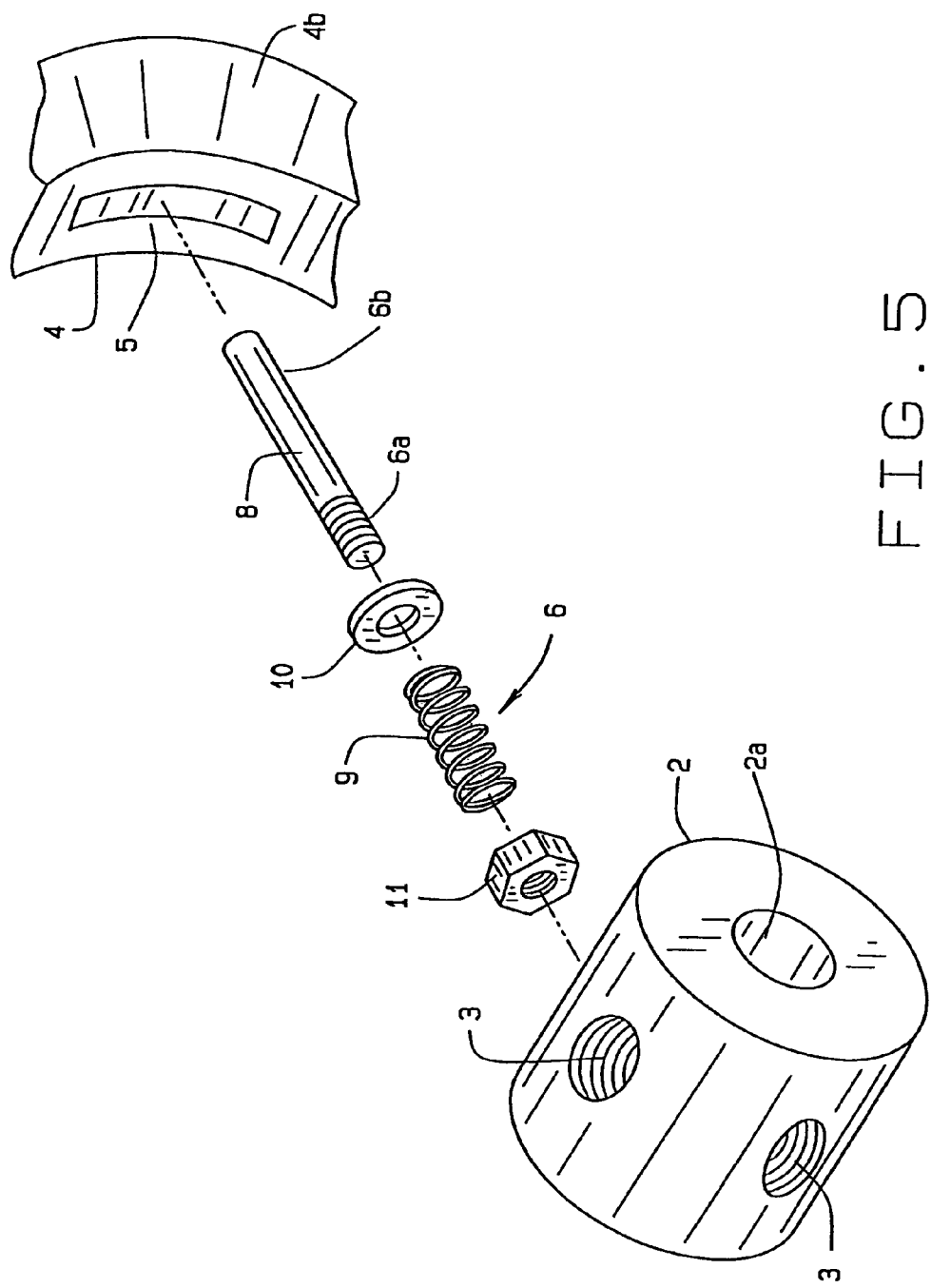
FIG. 5 describes a partial exploded view of the hub and one spoke.

The hub and assembly of an individual spoke are described in FIG. 5. A hub 2 has a generally symmetric cylindrical form, preferably with a thick solid wall. The wall thickness is at least 20% of the diameter of the hub. The hub has a longitudinal hole 2a coaxial with the length of the hub that admits an axle. Centered upon its length, the hub 2 has threaded holes 3 equally spaced around the circumference. The threaded holes extend radially into the hub and open into the longitudinal hole. Each threaded hole 3 has a flat area similar to a chord generally tangential to the hub. In the preferred embodiment, the hub has five equally spaced holes. At a minimum, the hub has three equally spaced holes for stability.

A spoke 6 is first assembled then engaged into a threaded hole 3. Each spoke has a second end 6b, preferably of the same diameter as the spoke, a threaded shaft 8, and a free end denoting the first end 6a opposite the second end. For assembly, a washer 10 is placed over the shaft and held at the second end, often adjacent to the interior surface 4b of the rim 4. The washer has an outside diameter that exceeds the width of a slot and an inside diameter to slide along the shaft of a spoke. Upon the washer, a spring 9 is then placed and partially compressed to expose the first end of the shaft. In the preferred embodiment a second washer 10 is then placed upon the first end 6a containing the spring upon the shaft to form a spoke 6. In the alternate embodiment shown, a nut 11 is placed upon the first end 6a and thus contains the spring upon the shaft. The first end 6a is then turned into a threaded hole 3 upon the hub 2. A spoke is then turned into each threaded hole so that the hub has five spokes extending radially in the preferred embodiment. Then the second ends 6b of each spoke are inserted into the respective slots 5 individually so the hub remains within the rim.

Figure 6:
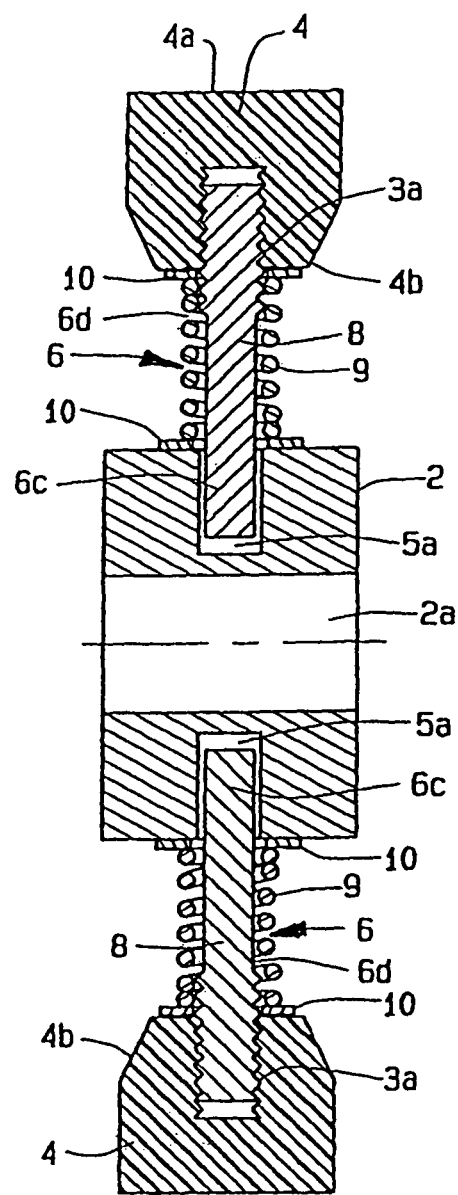
FIG. 6 shows a sectional view of an alternate embodiment of the connection of a spoke to the hub and to the rim.

An alternate, embodiment of the present invention then appears in FIG. 6. The alternate embodiment is shown in a section through the hub and generally two spokes 6. As before, a wheel has a rim 4 with a generally round shape, an interior surface 4b and an opposite exterior surface 4a. The wheel or tire adjoins the exterior surface while upon the interior surface 4b the rim has threaded holes 3a in a spaced pattern. The second end 6d of each spoke 6 threadily engages a matching hole 3a in the rim. The threaded holes 3a cooperate with the hub 2 and spokes 6 to install and adjust the present invention. The threaded holes 3a extend into the rim 4 but do not penetrate the exterior surface 4a nor reduce the structural integrity of the rim 4. From the second ends on each spoke, a shaft 8 proceeds on a radius of the wheel inwards towards the hub 2. The shaft 8 is generally a round cylinder. Outside of the shaft, at least one spring 9 is coaxial and around the shaft. The spring 9 abuts a washer 10 placed around the shaft 8 and towards the second end 6d but just inside the rim. Opposite the rim, the spring abuts another washer 10 upon the shaft adjacent to the hub 2 at the first end 6c of a spoke. Each first end enters a slot 5a in the hub 2. Each slot has sufficient clearance for rotation of the hub relative to the rim when the rim encounters an obstacle. A slot 5a has a generally rectangular shape upon a tangent to the hub. The shape and clearance of the slots permit the hub to rotate and partially translate while the rim remains fixed. The slots have sufficient depth so the second end may advance into the hub but not into the longitudinal hole 2a for adjusting the position of the hub within the spokes and the rim.

The present invention operates when a tire upon the wheel, as shown in FIG. 1, encounters an impacting force, such as a curb or other obstacle that may have a component parallel to the direction of travel of the wheel. When that occurs, the spokes are free to shift slightly within their respective slots, to absorb some of the force, but the bulk of the forces encountered, which will orient vectorially within the structure of the arranged spokes will bias against the various springs. For example, when a force is applied in the direction of travel, the hub will exert a force against the spokes also in the direction of travel and in turn against the springs, as can be understood. In addition, the angular direction of the vectorial force, exerted upon any and all spokes, will be applied against the springs and absorbed therein. Nevertheless, multiple point suspension is provided through the various spokes and their interrelationship with the springs, and the variety of springs, steel, nylon, neoprene, and the like, provides for absorption of the impact forces encountered, during use of the wheel, particularly as a caster.

When greater force is desired to be applied by the springs against the sides of the hub and the rim, the nuts can simply be tightened thus compressing the springs, in order to resist the impacting forces, but obviously, when tightened too excessively, may transmit more of the impacting force directly to the wheel and its equipment. And, if the nuts are loosened too extensively, the spokes may have too much freedom to shift within their slots, relative to the hub which will loosely move and sink under a load.

It should be readily noted that the concept of this invention is to provide a series of radially spaced spokes radiating from a hub, and which bias against springs coaxial with the spokes, which are adjustable, for the purpose of absorbing the various forces generated when an impact is encountered by a wheel during usage upon any vehicle or piece of equipment. The forces, whether they be radially disposed, perpendicularly disposed, or along any other vector of force, can be absorbed by the various cushioning springs that are built into the structure of this suspension system, and likewise, can cooperate with the various spokes that radiate from the hub, for cushioning against any impact force encountered, and to absorb it from transferring to the vehicle or equipment during usage of a vehicle in which the suspension system of this invention is installed.

Essentially, the invention includes the design of a wheel system, where the rim and tire will move independently of its hub, when a force is encountered. While the various designs and modifications herein are similar, they generally provide for the same desired results, to function as a suspension and shock absorbing system that can absorb vectorial forces.

As defined, each of these systems incorporates a one piece hub, which will have a number of spokes radiating therefrom, and it can be any number of such spokes, as defined, provided it is at least three in number. Preferably, an odd number of spokes will be used in order to encounter and absorb the vectors of the forces generated within the wheel, during usage. In the preferred embodiment, five of such spokes may be used.

In addition, nuts are threadily applied onto each of the shaft portions for each spoke to adjust the stiffness of each spring, to increase the magnitude of forces absorbed during impact, and to cushion such forces from being transferred from the wheel, through the vehicle, and to the cargo.

It is unique that the wheel resists any and all lateral forces applied to it because the movement is very near the rim, as opposed to the hub, where the forces are at their greatest. Dynamic forces on the wheel will allow the rim and tire to move independently on the hub, and the shock will be absorbed by the compression springs, and the slight radial shifting of the hub and its spokes, relative to the rim. Centrifugal forces generated during rotation of the wheel will cause the rim to center in relation to the hub, with a very quick reaction time to achieve such.

Upon acceleration and braking, the slots, spaced around the interior of the rim, will allow the spokes, particularly the heads, to slide therein, which causes the rotational forces from the hub to stop and lock any movement of the rim and tire, relative to the hub. The same is true of any braking forces generated within the wheel during usage of the vehicle.

Figure 7:
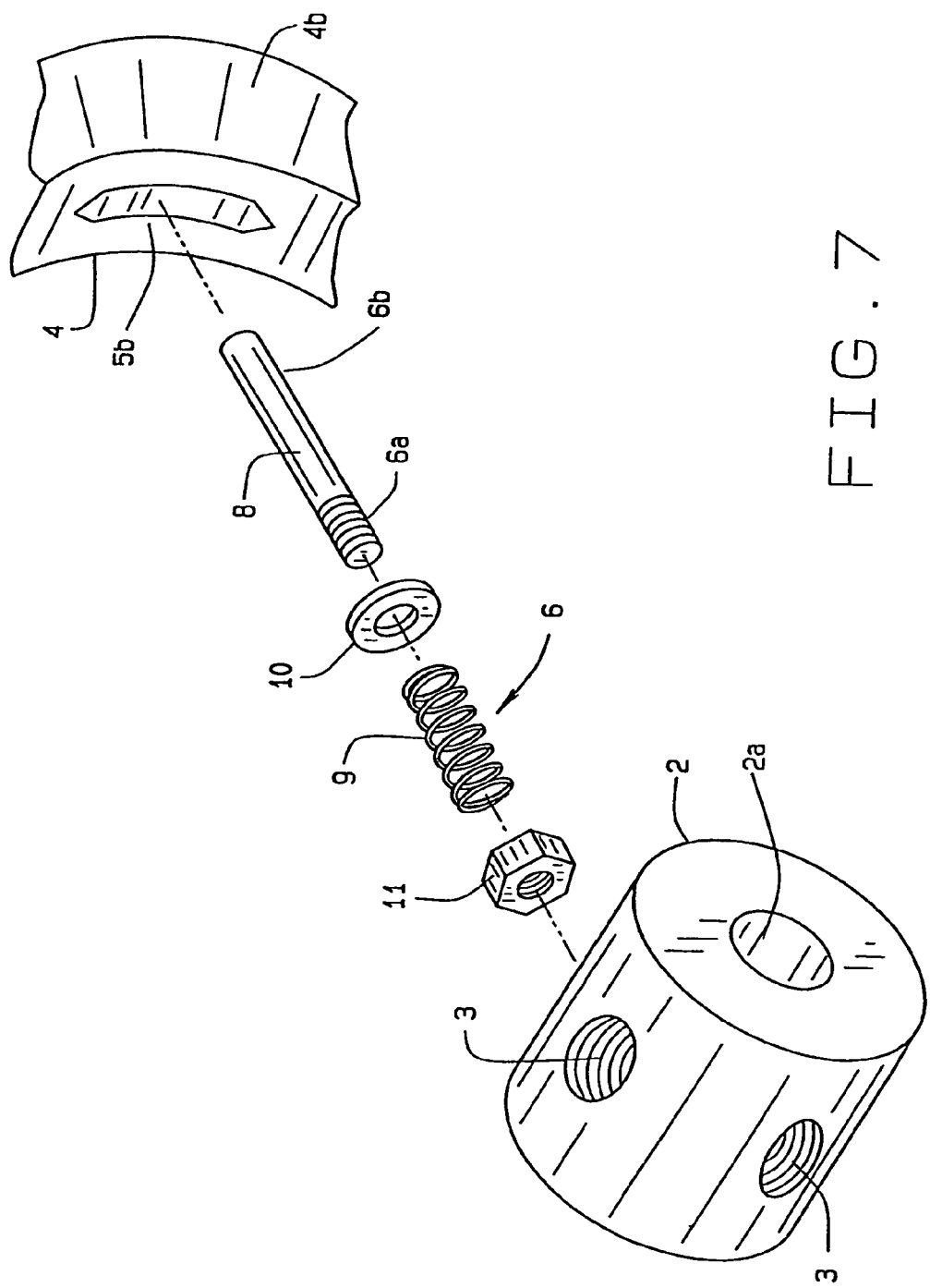
FIG. 7 describes a partial exploded view of the hub and one spoke including a round washer and a slot having tapered ends.

Returning to the drawings, FIG. 7 shows an alternate embodiment of the rim where the spoke connects. Similar to FIG. 5, the spoke 8 extends radially outward from the hub towards the rim and includes a washer 10. The spoke approaches the inner surface 4 of the hub and engages a slot 5b. This slot 5b has a generally elongated shape set into the rim and a depth to receive the spoke that allows for clearance when the spoke moves under load. The slot has two opposed ends that taper towards the centerline of the slot. The tapering of the ends increases the points of contact of the spoke with the ends thus reducing noise and impact stresses upon the rim and the spoke. Though tapered ends are shown, alternative shapes for the slot include polygonal, oval, ovoid, and rounded.

Figure 8:
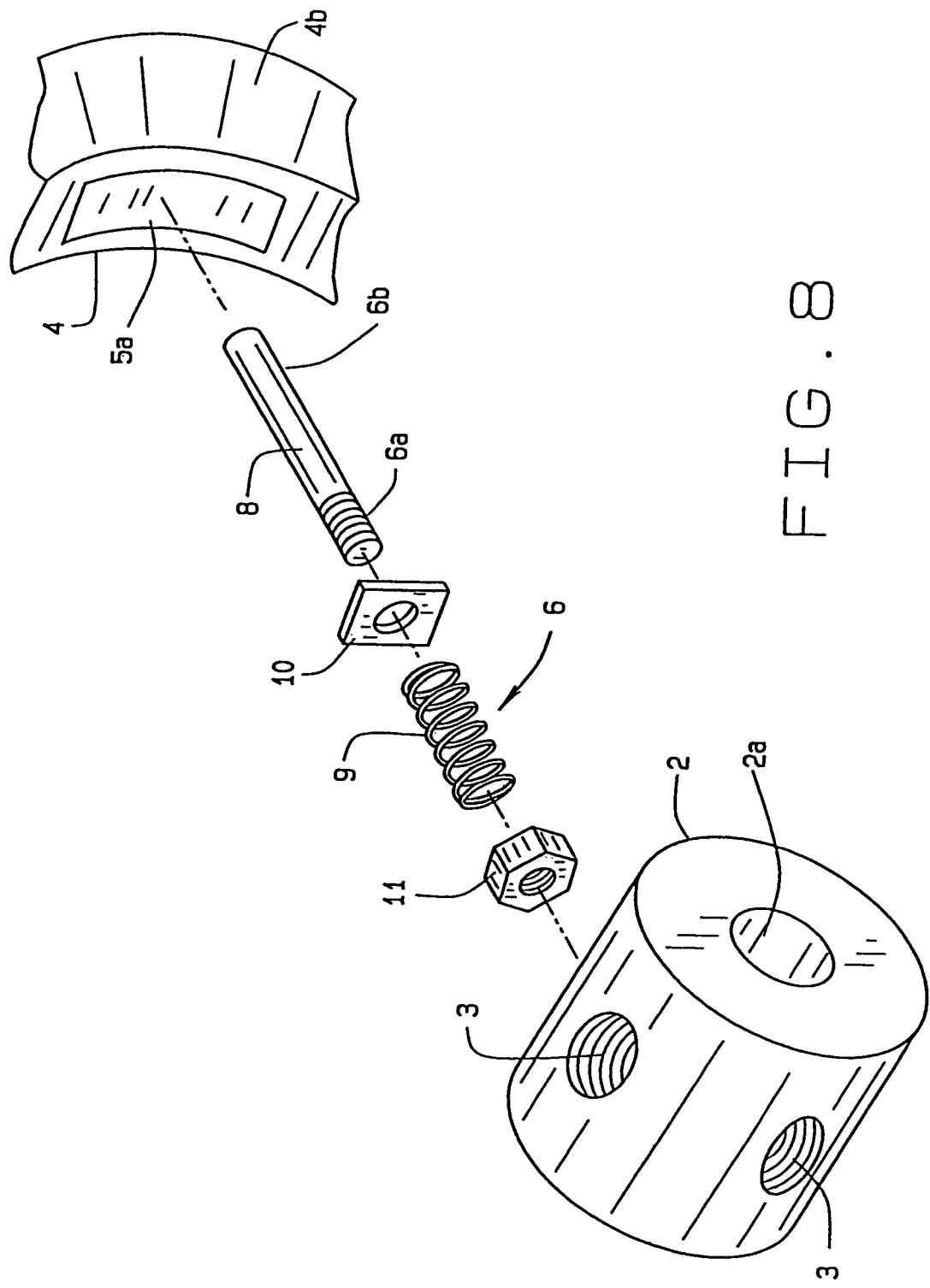
FIG. 8 describes a partial exploded view of the hub and one spoke where a square washer travels upon the spoke and within a rectangular keyway; and, FIG. 9 illustrates a plan view of a wheel where the washer travels upon a keyway generally upon a tangent to the rim.

FIG. 8 illustrates a further alternate embodiment of the rim at the spoke connection and of the washer upon the spoke similar to FIG. 7. In this figure, the washer 10 has a generally square shape while the slot 5a has an elongated rectangular shape recessed into the rim and a depth for receiving the spoke with enough clearance when the spoke moves under load. The length of the slot generally follows the circumference of the rim. The width of the slot matches the length of an edge of the washer. When assembled in this embodiment, the washer moves axially upon the spoke and slides snugly within the slot. As the washer and slot cooperate, the spoke moves along the centerline of the slot only.

Figure 9:
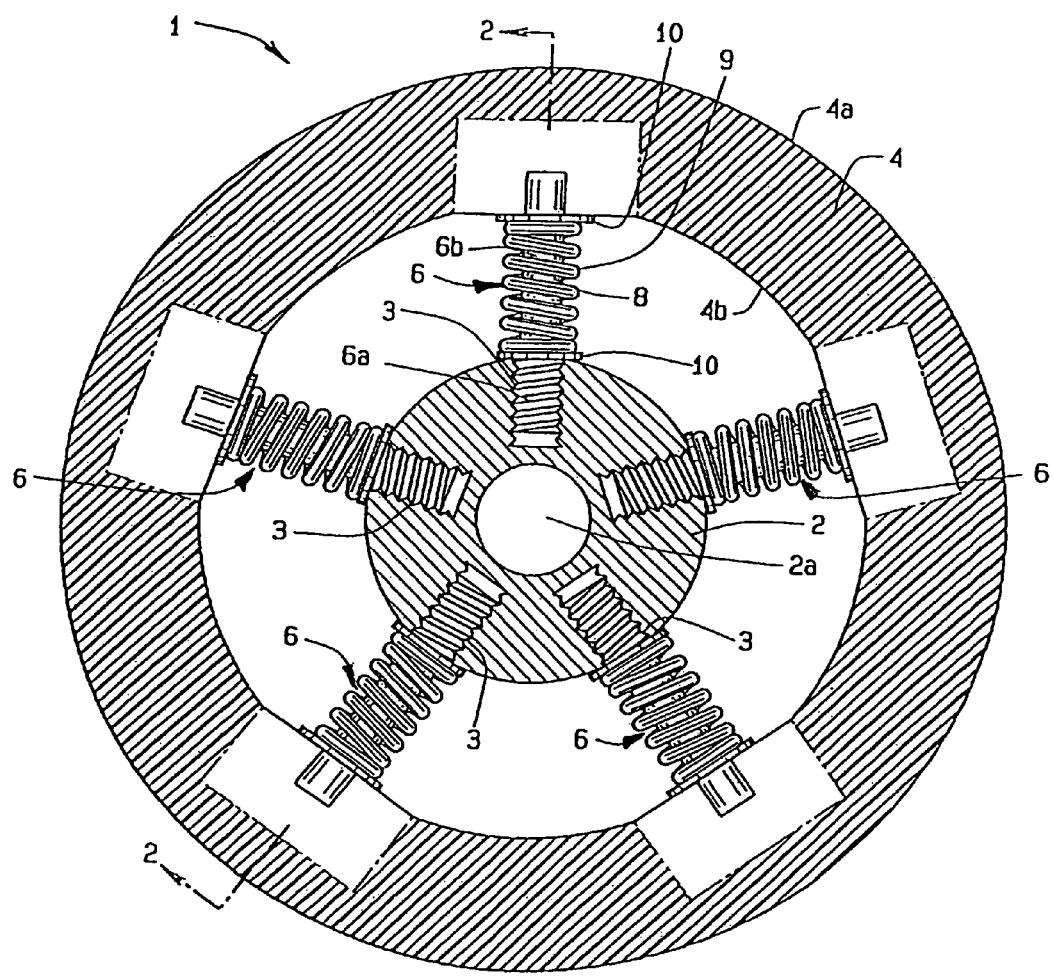

And then, FIG. 9 describes an alternate embodiment of the rim having flat surfaces where the spokes 10 engage the slots 5. As each slot is a partial opening of the inner surface of the rim, the washer travels upon the remaining inner surface of the rim when the spoke moves in response to loads placed upon the hub. When the washer travels upon a flat surface, the washer maintains its maximum surface area in contact with the rim thus lowering stresses upon the washer.

A still further alternate embodiment has the rim formed of two matching halves that assemble similar to FIG. 9 in finished form. This alternate embodiment though has a keyway formed in each slot upon assembly of the halves. The keyway has sufficient depth and width to admit the washer but not the spoke. The keyway is generally tangential to the spoke and serves as a guide for the washer within the rim. In usage, the keyway limits travel of the washer along the length of the slot and prevents pulling out of the washer from the rim when the hub is under load.

From the aforementioned description, an internal wheel suspension system with slotted rim has been described. The internal wheel suspension system with slotted rim is uniquely capable of suspending a hub within a wheel subject to forces from any angle in the plane of the wheel or caster. The internal wheel suspension system with slotted rim and its various components may be manufactured from many materials including but not limited to polymers, rugged plastics, neoprene, nylon, ferrous and non-ferrous metals and their alloys, and composites.

The concept of this invention is to provide an internal suspension system for a wheel or caster of a determined diameter, and upon which a tire is mountable. The system does include a hub, the hub has a generally cylindrical shape, and has an odd number of generally like spokes spaced equally radially about the hub and including a first end fixed to the hub, a generally straight shaft projecting radially outwardly from the hub, and a second end. Each spoke includes at least one spring mounted coaxially upon the shaft of said spoke with a first spring end thereof adjacent the hub, and biasing against the same, with a second spring end near the second end of the spoke, and with a washer also mounted coaxially upon the shaft and positioned against said second spring end. Said washer is of a determined size with substantially inner and outer bearing surfaces projecting radially outwardly from a center thereof, and said washer extends generally perpendicularly outwardly from the shaft with said inner bearing surface thereof in contact with the second end of the spring. An outer body rim of a solid construction has a generally round hallow shape of greater diameter than the hub, that forms an outer rim which is positioned generally concentrically with the hub, and the outer body rim having an exterior surface, and an interior surface, that is spaced inwardly from the exterior surface. The interior surface has a generally irregular circumferential shape defined by the outer rim, of a given diameter with a plurality of interspersed cords of the outer rim there along. The outer body rim includes a plurality of longitudinal rim slots extending into said rim from the interior surface thereof, and being spaced radially along the interior surface of said rim to align with the spokes, with each rim slot being associated with a corresponding chord along said interior surface of said rim. Said rim slots have widths corresponding to the size of the shafts of said spokes, and of lengths greater than the size of said shafts. The position and lengths of the rim slots defining the position and minimal lengths of the associated chords along said interior surface of said outer body. The second end of each shaft extends into an aligned rim slot with said washer on said shaft disposed generally perpendicularly to said shaft and arresting against said associated chord when the wheel is at rest with said outer bearing surface thereof substantially holly in contact with said associated chord, and with said washer compressing said spring of the spoke there against. The shafts of the spokes being longitudinally movable within said rim slots and said washers being slidably movable substantially without binding along said associated chords of the interior surface of said rim with said outer bearing surfaces of said washers remaining substantially holly in contact with said associated chords against said associated chords during rotation of the wheel to absorb generally impacting forces applied to the wheel during usage.

Variations or modifications to the subject matter of this invention may occur to those skilled in the art upon review of the summary of the invention as provided herein. The description of the invention as set forth in the description of the preferred embodiment, and as shown in the drawings, are provided for illustrative purposes only. The embodiments, as described, are furnished for explaining the spirit of this invention.

As such, those skilled in the art will appreciate that the conception, upon which this disclosure is based, may readily be utilized as a basis for the designing of other structures, methods and systems for carrying out the several purposes of the present invention. Therefore, the claims include such equivalent constructions insofar as they do not depart from the spirit and the scope of the present invention.

I claim:

1. An internal suspension system for a wheel or caster of a determined diameter upon which a tire is mountable, comprising:
    a hub, said hub having a generally cylindrical shape;
    an odd number of generally like spokes spaced generally equally radially about said hub and including a first end fixed to said hub, a generally straight shaft projecting generally radially outwardly from said hub, and a second end;
    each said spoke including at least one spring mounted coaxially upon said shaft of said spoke with a first spring end thereof adjacent said hub, with a second spring end located approximate the second end of said spoke, and with a washer also mounted coaxially upon said shaft and positioned against said second spring end;
    said washer being of a determined size with substantially parallel inner and outer bearing surfaces projecting radially outwardly from a center thereof, said washer extending generally perpendicularly outwardly from said shaft with said inner bearing surface thereof in contact with said second spring end;
    an outer body rim of a solid construction having a generally round hollow interior and of greater diameter than said hub and forming an outer body rim and positioned generally concentrically with said hub, said outer body rim having an exterior surface and an interior surface spaced inwardly from said exterior surface, said interior surface of said outer body rim having a plurality of spaced flat surfaces;
    said outer body rim including a plurality of longitudinal rim slots extending into said rim from the interior surface thereof and spaced radially along the interior surface of said rim and extending through said formed flat surfaces and aligned with said spokes, with each rim slot being associated with a corresponding flat surface along said interior surface of said rim;
    said rim slots having widths corresponding to the size of said shafts of said spokes and lengths greater than the size of said shafts;
    the position and lengths of said rim slots defining the position and minimum lengths of said associated chords along said interior surface of said outer body;
    the second end of each shaft extending into an aligned rim slot with said washer on said shaft disposed generally perpendicularly to said shaft and resting against said associated formed flat surface when the wheel is at rest with said outer bearing surface thereof substantially wholly in contact with said associated flat surface and with said washer compressing said spring of such spoke between said hub and said interior surface of said rim; and
    said shafts of said spokes being longitudinally movable within said rim slots and said washers being slidably movable substantially without binding along said associated flat surfaces of said interior surface of said rim with said outer bearing surfaces of said washers remaining substantially wholly in contact with said associated flat surfaces during rotation of the wheel to absorb generated impacting forces applied to the wheel during usage.

2. The internal suspension system of claim 1 and further comprising:
    said first end of the shaft also having another washer located between said spring and said hub to accommodate the contact of said spring against the hub during usage of the wheel.

3. The internal suspension system of claim 1 further comprising:
    each slot in said rim having a generally rectangular shape to accommodate the location of the second end of a shaft therein, the chord associated with each slot along the interior surface of said rim being arranged generally perpendicular to the axis of said associated shaft when the wheel is at rest, said chord having a dimension to accommodate the locating of the first said washer thereupon and to permit the shaft to shift approximately five degrees during rotation of the wheel during usage.

4. The internal suspension system of claim 1 and further comprising:
    said hub and rim having five equally spaced spokes.

5. The internal suspension system of claim 1 and further comprising:
    the second end of each shaft being threadily engaged within said hub.

6. The internal suspension system of claim 5 wherein each shaft has a nut threadily engaged thereon, in proximity where the shaft threadily engages within said hub, and said nut thereby constrains said spring upon said spoke between said washer and said threadily engaged nut.

7. The internal suspension system of claim 1 wherein said spring is one of steel, nylon, or neoprene.

8. The internal suspension system of claim 1 wherein each of said washers has a square shape.

9. An internal suspension system for a wheel or caster of a determined diameter, comprising:

a hub, said hub having a generally cylindrical shape;

a rim having a generally round hollow shape of greater diameter than said hub, said rim having an exterior surface, and an interior surface opposite said exterior surface, said rim having at least three equally spaced rim slots extending inwardly from the interior surface of said rim;

at least three spokes, each spoke having a first end and an opposite second end; each of said spokes having a shaft centered thereupon and at least one spring provided coaxial upon each shaft, the first end of each shaft being fixed to the hub, and the second end of each shaft locating within an aligned rim slot, one of said springs locating upon each shaft and extending in compression between said hub and said rim, a washer provided upon the second end of each shaft and biasing against the proximate end of said spring and contacting the interior surface of the rim at the location of its formed slot, the interior surface of said rim at the location of the formed slots being flat along the interior circumference of said rim and arranged approximately perpendicular to the axis of the shaft to allow the washer to shift thereupon during rotation of said wheel and to allow the spokes to shift within their respective slots when the shaft and associated springs absorb the generated impacting forces applied to the wheel during usage.

10. The internal suspension system of claim 9 and further comprising:

said first end of the shaft also having another washer located between said spring and said hub to accommodate the contact of said spring against the hub during usage of the wheel.

11. The internal suspension system of claim 9 further comprising:

each slot in said rim having a generally rectangular shape to accommodate the location of the second end of a shaft therein, and the flat surface provided around each slot along the inner surface of said rim being arranged generally perpendicular to the axis of said associated shaft, and said flat surface having a dimension to accommodate the locating of the first said washer thereupon and to permit the shaft to shift approximately five degrees during rotation of said wheel during usage.

12. The internal suspension system of claim 9 and further comprising:

said hub and rim having five equally spaced spokes in its assembly.

13. The internal suspension system of claim 9 and further comprising:

the second end of each shaft threadily engaging within said hub.

14. The internal suspension system of claim 13 and each shaft having a nut threadily engaged thereon, in proximity where the shaft threadily engages within in said hub, and said nut thereby containing said spring upon said spoke between said washer and said threadedly engaged nut.

15. The internal suspension system of claim 9 wherein said spring is one of steel, nylon, or neoprene.

16. The internal suspension system of claim 9 wherein each of said washers has a square shape.

\* \* \* \* \*